United States Patent [19]

Sadamura et al.

[11] Patent Number: 5,093,100

[45] Date of Patent: Mar. 3, 1992

[54] PLATE-LIKE MAGNETITE PARTICLES, PLATE-LIKE MAGHEMITE PARTICLES AND PROCESSES OF PRODUCING THE SAME

[75] Inventors: Hideaki Sadamura; Atsushi Takedoi, both of Hiroshima, Japan

[73] Assignee: Toda Kogyo Corp., Hiroshima, Japan

[21] Appl. No.: 493,121

[22] Filed: Mar. 15, 1990

[30] Foreign Application Priority Data

Oct. 11, 1989 [JP] Japan ................................ 1-265512

[51] Int. Cl.⁵ ............................................. C01G 49/08
[52] U.S. Cl. ................................... 423/632; 423/634; 342/1; 252/62.56
[58] Field of Search ................. 423/632, 634; 342/1; 252/62.56

[56] References Cited

U.S. PATENT DOCUMENTS

| | | | |
|---|---|---|---|
| 4,311,684 | 1/1982 | Umeki | 423/632 |
| 4,404,254 | 9/1983 | Franz et al. | 423/634 |
| 4,865,834 | 9/1989 | Tanihara et al. | 423/634 |

FOREIGN PATENT DOCUMENTS

| | | |
|---|---|---|
| 0180881 | 11/1984 | European Pat. Off. . |
| 0279626 | 12/1987 | European Pat. Off. . |
| 0279626 | 8/1988 | European Pat. Off. . |
| 2051027 | 5/1980 | United Kingdom . |

OTHER PUBLICATIONS

Chemical Abstracts, vol. 92, No. 6, 2/80, p. 119, Abstract No. 44001e, U.S. & JP-A-79 101 796 (Sumitomo Metal Mining).
Chemical Abstracts, vol. 100, No. 26, 6/84, p. 90, Abstract No. 211715h, "Studies on Micaceous . . . Iron Oxide" Ham et al.

*Primary Examiner*—R. Bruce Breneman
*Attorney, Agent, or Firm*—Nixon & Vanderhye

[57] ABSTRACT

Disclosed herein are poreless, non-sintered plate-like magnetite particles having an average particle diameter of more than 0.5 μm and not more than 2.0 μm, and a BET specific surface area of not more than 6.0 m²/g, and poreless, non-sintered plate-like maghemite particles having an average particle diameter of more than 0.5 μm and not more than 2.0 μm, and a BET specific surface area of not more than 6.0 m²/g.

8 Claims, 4 Drawing Sheets

(×10000)

(X10000)

(X10000)

(X15000)

(X30000)

(×12000)

PLATE-LIKE MAGNETITE PARTICLES, PLATE-LIKE MAGHEMITE PARTICLES AND PROCESSES OF PRODUCING THE SAME

BACKGROUND OF THE INVENTION

The present invention relates to poreless, non-sintered plate-like magnetite and plate-like maghemite particles having an average diameter of more than 0.5 μm and not more than 2.0 μm, and a specific surface area of not more than 6.0 m²/g, and processes of producing the same. The plate-like magnetite particles and plate-like maghemite particles of the present invention are useful to materials for manufacturing electromagnetic wave absorbers and shields.

The use of magnetite particles and maghemite particles as the manufacturing materials for the electromagnetic wave absorbers and shields is known.

This fact is disclosed, for example, Japanese Patent Application Laid-Open (KOKAI) No. 54-110496 (1979) discloses: "the electromagnetic wave absorption properties of magnetite ($Fe_3O_4$) were examined in comparison to those of conventional composite ferrites and in the microwave region of 5–10 GHz, the material can be made thinner, and has better workability and superior electromagnetic wave absorption to composite ferrites."

Electromagnetic wave absorption and shielding are carried out by applying a paint obtained by preparing a dispersion of magnetite particles or maghemite particles in a vehicle, to buildings, ships and aircraft which reflect such waves, or to instruments which generate such waves.

It is required that the magnetite or maghemite particles used as materials for electromagnetic wave absorption and shield materials are plate-like particles, have excellent dispersibility in the vehicle, and have a large particle size, specifically a particle size of not less than 0.5 μm.

Concerning the shape of the particles, it is disclosed, for example, in Japanese Patent Application Laid-Open (KOKAI) No. 61-77626 (1986) that: "plate-like ferrite particles have excellent properties as electromagnetic wave absorption and shielding materials in the low frequency region, and these properties are not achieved by ordinary ferrite particles"; in Japanese Patent Application Laid-Open (KOKAI) No. 55-104923 (1980) that: "a very remarkable parallel orientation of individual particles is produced in the covering material. Accordingly, a very high packing density can thus be achieved, and as a result, for example, anti-corrosion is enhanced, screening of electromagnetic interference becomes more effective, and electrical conductivity is increased"; and "there are other uses for hexagonal thin-plate (plate-like) iron oxide particles having a magnetite or maghemite structure . . . a very remarkable parallel orientation of individual particles is produced. A very high packing density is therefore, can be achieved." It is, therefore, evident that plate-like particles are necessary.

Next, with regard to the particle size, it is disclosed in the above Japanese Patent Application Laid-Open (KOKAI) No. 61-77626 (1986) that: "the average major diameter of the particles is not less than 0.5 μm".

Conventionally, a process for producing plate-like magnetite particles is known, for example:

(i) a process comprising steps of autoclaving an alkaline suspension containing ferric hydroxide or goethite to form plate-like hematite particles in aqueous solution, and reducing the thus obtained plate-like hematite particles under heating in a reducing gas; and (ii) a process comprising steps of rapidly oxidizing an alkaline suspension containing ferrous hydroxide with a strong oxidizing agent, or reacting a ferric salt with alkali in an aqueous medium in the presence of specific additives to produce ferric hydroxide, autoclaving the thus obtained ferric hydroxide, thereby obtaining plate-like goethite particles in aqueous solution dehydrating the said plate-like goethite particles under heating, and reducing the obtained particles under heating in a reducing gas.

Also, a process for producing plate-like maghemite particles is known, for example:

(iii) a process comprising steps of autoclaving an alkaline suspension containing ferric hydroxide or goethite to form plate-like hematite particles in aqueous solution, reducing the thus obtained plate-like hematite particles under heating in a reducing gas, and then oxidizing the obtained particle under heating; and (iv) a process comprising steps of rapidly oxidizing an alkaline suspension containing ferrous hydroxide with a strong oxidizing agent, or reacting a ferric salt with alkali in an aqueous medium in the presence of specific additives to produce ferric hydroxide, autoclaving the thus obtained ferric hydroxide, thereby obtaining plate-like goethite particles in aqueous solution, dehydrating the said plate-like goethite particles by heating, reducing the obtained particle under heating in a reducing gas, and then oxidizing the obtained particles under heating.

The processes (i) and (iii) are disclosed in Japanese Patent Application Laid-Open (KOKAI) No. 51-28700 (1976) and Japanese Patent Application Laid-Open (KOKAI) No. 55-104923 (1975). The processes (ii) and (iv) are disclosed in Japanese Patent Application Laid-Open (KOKAI) No. 61-266311 (1986) and Japanese Patent Application Laid-Open (KOKAI) No. 55-104923 (1980).

Plate-like magnetite and maghemite particles having excellent dispersibility and large size, and in particular, having a particle size of more than 0.5 μm are, therefore, strongly demanded at the present. However, in the case of the known processes mentioned above, it is necessary to reduce the plate-like particles formed in aqueous solution under heating in a reducing gas. In this reducing process, rapid particle growth takes place, whereby the sintering of particle and between particles arises. As a result, it becomes difficult to disperse the particles in the vehicle or the resin, and accordingly the packing density lowers and particles orientation is impaired.

It is well-known that when plate-like magnetite particles are oxidized under heating so as to form plate-like maghemite particles, particle growth does not take place and, therefore, the sintering of particle and between particles do not occur.

Further, in the case of the processes (ii) and (iv), water in goethite crystals is dehydrated when plate-like goethite particles are heated, and many pores are, therefore, produced on the surfaces of and inside the obtained plate-like magnetite particles. When the plate-like maghemite particles are obtained by oxidizing the plate-like magnetite particles under heating, many pores remain on the surfaces of and inside the particles. If such porous plate-like magnetite or plate-like maghemite particles are dispersed in a vehicle or a resin, other fine particles are attracted to the portions where there are superficial magnetic poles. As a result, many particles agglomerate together, and agglomerated lumps of fairly large size are formed. The dispersion of the particles in a vehicle is then rendered difficult, and the particle orientation is impaired.

As is clear from the above discussion, in order to obtain poreless, non-sintered maghemite particles, plate-like magnetite particles should be formed directly in aqueous solution.

The present inventors, in order to overcome the above disadvantages, already proposed a process of forming directly poreless, non-sintered plate-like magnetite particles in aqueous solution (European Patent No. 0279626A). Using this process, however, plate-like magnetite particles of a large particle size, specifically of a particle size of more than 0.5 μm, could not be obtained.

The coercive force and residual magnetization of magnetite particles is correlated with particle size. As the size increases, the coercive force and residual magnetization lower, so particles of large size are preferable for electromagnetic wave absorbers and shielding materials.

It is, therefore, strongly demanded to offer a process for directly forming large particles of plate-like magnetite, and especially plate-like magnetite particles having a particle size of more than 0.5 μm in aqueous solution.

As a result of the present inventor's studies for forming plate-like magnetite particles directly in aqueous solution, and forming plate-like maghemite particles of large size, especially plate-like maghemite particles having a particle size of larger than 0.5 μm, it has been found that by autoclaving an alkaline suspension of ferric oxide hydroxide particles and ferrous hydroxide in the presence of sulfate ion in the temperature of 200°-300° C., and as occasion demands, oxidizing the thus obtained plate-like magnetite particles obtained under heating in air, the obtained plate-like magnetite and plate-like maghemite particles are poreless, non-sintered particles having an average diameter of more than 0.5 μm and not more than 2.0 μm and a specific surface area of not more than 6.0 m$^2$/g. Based on this finding, the present invention has been attained.

SUMMARY OF THE INVENTION

In a first aspect of the present invention, there is provided poreless, non-sintered plate-like magnetite particles having an average particle diameter of more than 0.5 μm and not more than 2.0 μm, and a BET specific surface area of not more than 6.0 m$^2$/g.

In a second aspect of the present invention, there is provided poreless, non-sintered plate-like maghemite particles having an average particle diameter of more than 0.5 μm and not more than 2.0 μm, and a BET specific surface area of not more than 6.0 m$^2$/g.

In a third aspect of the present invention, there is provided a process for producing poreless, non-sintered plate-like magnetite particles as defined in the 1st aspect, comprising autoclaving an alkaline suspension containing ferric oxide hydroxide particles and ferrous hydroxide in the presence of sulfate ion at a temperature of 200°-300° C.

In a fourth aspect of the present invention, there is provided a process for producing poreless, non-sintered plate-like maghemite particles as defined in the 2nd aspect, comprising autoclaving an alkaline suspension containing ferric oxide hydroxide particles and ferrous hydroxide in the presence of sulfate ion at a temperature of 200°-300° C. to form plate-like magnetite particles, and oxidizing the obtained plate-like magnetite particles under heating in air.

DETAILED DESCRIPTION OF THE INVENTION

Figure 1:
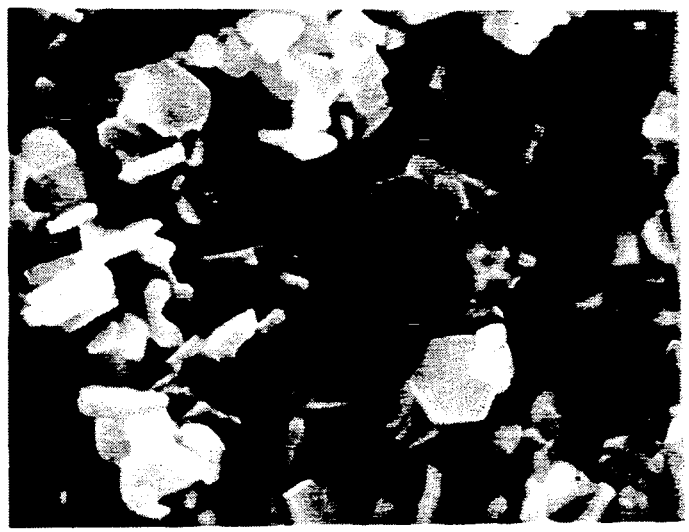
FIG. 1, and FIGS. 3 to 5 are electron micrographs showing the plate-like magnetite particles obtained in Examples 1 to 4 respectively.

In the present invention, an alkaline suspension of ferric oxide hydroxide particles and ferrous hydroxide is autoclaved in the presence of sulfate ion in the temperature range 200°-300° C., thereby obtaining poreless, non-sintered plate-like magnetite particles which are large and, in particular, more than 0.5 μm, and the said plate-like magnetite particles are then oxidized under heating in air, thereby obtaining poreless, non-sintered plate-like maghemite particles which are large and, in particular, more than 0.5 μm.

The reason why, in the present invention, magnetite particles of plate-like form are obtained is not yet understood, but since plate-like magnetite particles are not formed when sulfate ion is not present as will become clear from the Comparative Examples described below, the present inventors consider that sulfate ion has some effect on the shape of the magnetite particles produced.

Further the reason why, in the present invention, plate-like magnetite particles of large size are formed is also not yet understood. However, since large particles, and especially particles having an average particle diameter of more than 0.5 μm cannot be formed when plate-like magnetite particles are produced at 100° C. or below at normal pressure, as will become clear from the Reference Example described below, the present inventors consider that high temperature and high pressure have some effect on the size of magnetite particles produced.

The plate-like magnetite and maghemite particles of the present invention are large particles of an average particle diameter of more than 0.5 μm and not more than 2.0 μm, preferably 0.7 to 2.0 μm. Further, as the particles are formed directly in aqueous solution, they are poreless, and as the particles do not undergo a reduction under heating, they are also non-sintered.

As the plate-like magnetite and maghemite particles of the present invention are large and poreless, their BET specific surface area is not more than 6.0 m$^2$/g, preferably 1.5 to 6.0 m$^2$/g, more preferably 2.5 to 5.5 m$^2$/g, and further these plate-like particles are poreless and non-sintered, they can easily be made into paints. Their dispersibility and orientation are more excellent, and high packing density in the vehicle or resin can be achieved.

Further, the coercive force (Hc) of the plate-like magnetite particles in the present invention is not more than 80 Oe, preferably 50 to 60 Oe, and also the coercive force (Hc) of the plate-like maghemite particles in the present invention is not more than 80 Oe, preferably 50-75 Oe. As a result, since a high magnetic permeability ($\mu$) are easily obtained, and the plate-like magnetite particles are, therefore, very useful as powders for electromagnetic wave absorber and shield materials.

In the present invention, as the ferric oxide hydroxide particles $\alpha$, $\beta$ or $\gamma$-FeOOH may be used.

In the present invention, the ferrous hydroxide may be produced by reacting a ferrous salt with alkali.

As the ferrous salt, ferrous sulfate or ferrous chloride may be used, and as the alkali, sodium hydroxide may be used.

The sulfate ion of the present invention may be a by-produced ion of a reaction of a ferrous salt with alkali, or it may be supplied by adding a sulfate such as sodium sulfate or metal sulfate such as manganese sulfate, zinc sulfate or nickel sulfate.

The concentration of ferric oxide hydroxide particles in the alkaline suspension is 0.05-1.0 mol/l preferably 0.1-0.5 mol/l and the mole ratio of ferrous hydroxide to ferric oxide hydroxide particles is 2:1-1.5, preferably 2:1-1.2.

The concentration of sulfate ion in the alkaline suspension is 0.025-1.0 mol/l, preferably 0.05-0.5 mol/l. If the concentration of sulfate ion in the alkaline suspension is less than 0.025 mol/l, it tends to become difficult to form plate-like magnetite particles.

The concentration of free OH ion in the alkaline suspension is 0.1-10 mol/l, preferably 1.0-7 mol/l. With increasing concentration of free OH ion, the plate-like magnetite particles obtained tend to become thinner and the plate ratio increases. If the concentration of free OH ion is less than 0.1 mol/l, the reaction slows down and it tends to become difficult to form plate-like magnetite particels.

The autoclaving process of the present invention may be carried out in a high temperature, high pressure vessel such as an autoclave.

The autoclaving temperature in the present invention is 200°-300° C.

If the temperature is less than 200° C. the particle size distribution of the plate-like magnetite particles widens. If the temperature exceeds 300° C., plate-like magnetite particles can still be formed, but from the viewpoint of safety of the equipment, the upper limit of temperature is 300° C.

The autoclaving time in the present invention may be the time required to form plate-like magnetite particles directly in aqueous solution, there being no special restriction on this time.

The oxidation of the plate-like magnetite particles in the present invention under heating in air may be carried out by the usual method, and the temperature should preferably be 200°-400° C.

The plate-like magnetite and maghemite particles of the present invention have an average particle diameter of more than 0.5 $\mu$m and not more than 2.0 $\mu$m, preferably 0.7-2.0 $\mu$m; a BET specific surface area of not more than 6.0 m$^2$/g, preferably 1.5-6.0 m$^2$/g, more preferably 2.5-5.5 m$^2$/g; a coercive force (Hc) of not more than 80 Oe, preferably 50-65 Oe (in case of plate-like magnetite particles) or 50-75 Oe (in case of plate-like maghemite particles); and aspect ratio (ratio of plate surface diameter to thickness) of 3-35:1, preferably 5-30:1; and a squareness ratio (ratio of $\sigma_r$ to $\sigma_s$) of 0.070-0.125:1, preferably 0.075-0.095:1 (in case of plate-like magnetite particles) or 0.075-0.120:1 (in case of plate-like maghemite particles). In addition, as the plate-like particles are poreless and non-sintered, they have excellent dispersibility in a vehicle or a resin, and since plate-like particles are large particles which especially exceed 0.5 $\mu$m in particle size, they are suitable for use as powders for electromagnetic wave absorber and shield materials.

Further, the plate-like magnetite and maghemite particles of the present invention are of a brown to black color, and as the plate-like particles have excellent dispersibility in a vehicle or resin, they may be used as coloring pigments. In addition to the above properties, moreover, as these plate-like particles are magnetic, they may also be expected to be useful as magnetic color toners. Also, since the plate-like magnetite and maghemite particles of the present invention are excellent in mechanical properties such as rigidity and apparant density, they may be expected to be useful as a vehicle damping material.

EXAMPLES

We shall now explain the present invention in more detail with reference to examples and comparative examples.

Average particle diameters and aspect ratios (ratio of plate surface diameter to thickness) given in the examples and comparative examples are averages of values measured from electron micrographs, and specific surface was measured by the BET method. Measurement of magnetization was carried out by an vibrating sample magnetometer VSMP-1 (Toei Kogyo Co.) under a field of 10 KOe.

MANUFACTURE OF PLATE-LIKE MAGNETITE PARTICLES

EXAMPLES 1-4

COMPARATIVE EXAMPLE 1

REFERENCE EXAMPLE 1

EXAMPLE 1

0.093 mol of $\alpha$-FeOOH, 0.046 mol of FeSO$_4$ and 0.7 mol of NaOH were mixed together, and the total volume made up to 0.7 l. After introducing the resultant mixture into an autoclave, it was heated to 220° C., and maintained at this temperature with mechanical stirring for 2 hours so as to form a black precipitate. After cooling to room temperature, the obtained black precipitate was filtered off, washed with water, dried and disagregated by the usual methods.

The obtained black particles were shown by transmission electron microscopy to have an average particle diameter of 1.0 $\mu$m. As is seen from the scanning electron micrograph in FIG. 1 ($\times$10,000), the plate-like particles had an aspect ratio (ratio of plate surface diameter to thickness) of 7:1, and there were no pores on the surface of or inside the particles.

Figure 2:
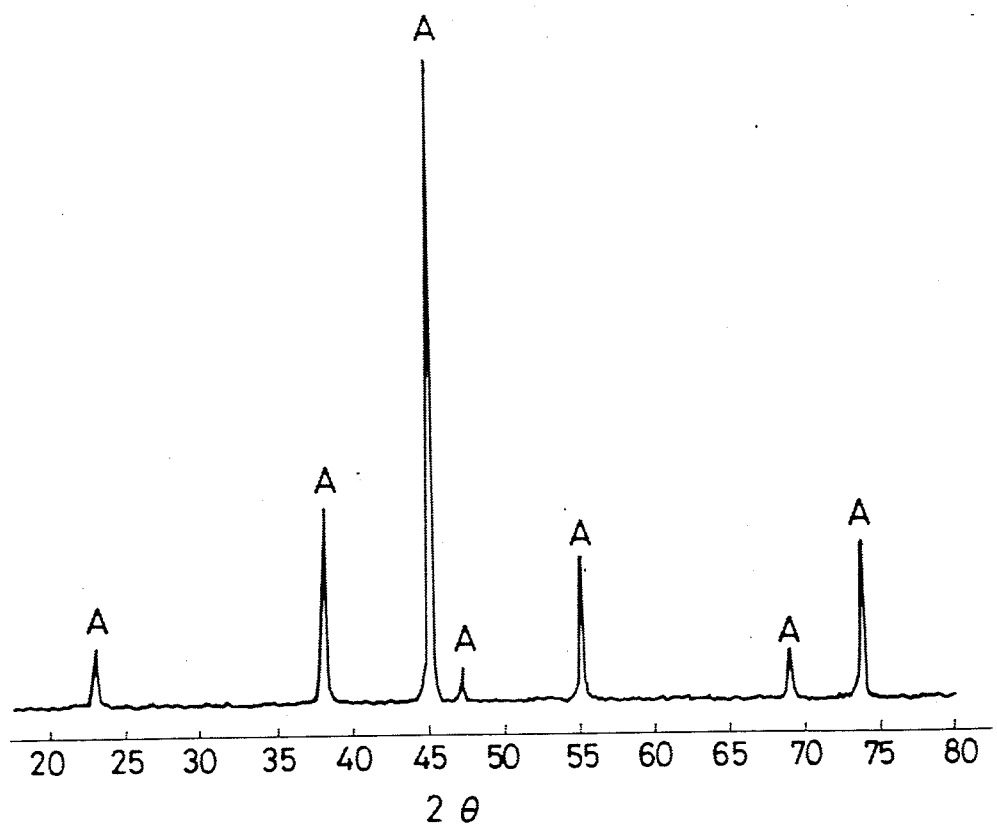
FIG. 2 is the X-ray diffraction pattern of the plate-like magnetite particles obtained in Example 1.

Further, the obtained particles were individually distributed (non-sintered), its BET specific surface area was 2.8 m$^2$/g, its squareness ratio ($\sigma_r/\sigma_s$) was 0.078, and the particles had an excellent orientation. The coercive force (Hc) of the particles was 58 Oe. FIG. 2 shows the X-ray diffraction pattern of the particles. In FIG. 2, the peaks A corresponds to magnetite, and it may thus be concluded that the particles consisted of magnetite.

EXAMPLE 2

0.093 mol of $\alpha$-FeOOH, 0.046 mol of FeSO$_4$ and 4.2 mol of NaOH were mixed together, and the total volume made up to 0.7 l. After introducing the resultant mixture into an autoclave, it was heated to 250° C., and maintained at this temperature with mechanical stirring for 2 hours so as to form a black precipitate. After cooling to room temperature, the obtained black precipitate was filtered off, washed with water, dried and disagregated by the usual methods.

Figure 3:

The obtained black particles were shown by transmission electron microscopy to have an average particle diameter of 1.5 μm. As is seen from the scanning electron micrograph in FIG. 3 (×10,000), the plate-like particles had an aspect ratio (ratio of plate surface diameter to thickness) of 21:1, and there were no pores on the surface of or inside the particles.

Further, the obtained particles were individually distributed (non-sintered), its BET specific surface area was 5.5 m$^2$/g, its squareness ratio ($\sigma_r/\sigma_s$) was 0.087, and the particles had an excellent orientation. The coercive force (Hc) of the particles was 64 Oe.

The X-ray diffraction pattern of the particles showed only peaks corresponding to magnetite, and it may thus be concluded that the particles consisted of magnetite.

EXAMPLE 3

0.093 mol of α-FeOOH, 0.046 mol of FeSO$_4$ and 0.35 mol of NaOH were mixed together, and the total volume made up to 0.7 l. After introducing the resultant mixture into an autoclave, it was heated to 280° C., and maintained at this temperature with mechanical stirring for 2 hours so as to form a black precipitate. After cooling to room temperature, the obtained black precipitate was filtered off, washed with water, dried and disagregated by the usual methods.

Figure 4:

The obtained black particles were shown by transmission electron microscopy to have an average particle diameter of 0.7 μm. As is seen from the scanning electron micrograph in FIG. 4 (×10,000), the plate-like particles had an aspect ratio (ratio of plate surface diameter to thickness) of 6:1, and there were no pores on the surface of or inside the particles.

Further, the obtained particles were individually distributed (non-sintered), its BET specific surface area was 3.5 m$^2$/g, its squareness ratio ($\sigma_r/\sigma_s$) was 0.092, and the obtained particles had an excellent orientation. The coercive force (Hc) of the particles was 57 Oe.

The X-ray diffraction pattern of the particles showed only peaks corresponding to magnetite, and it may thus be concluded that the particles consisted of magnetite.

EXAMPLE 4

0.093 mol of α-FeOOH, 0.046 mol of FeCl$_2$ and 5.6 mol of NaOH were mixed together, 0.1 mol of Na$_2$SO$_4$ was added, and the total volume made up to 0.7 l. After introducing the resultant mixture into an autoclave, it was heated to 220° C., and maintained at this temperature with mechanical stirring for 2 hours so as to form a black precipitate. After cooling to room temperature, the obtained black precipitate was filtered off, washed with water, dried and disagregated by the usual methods.

Figure 5:
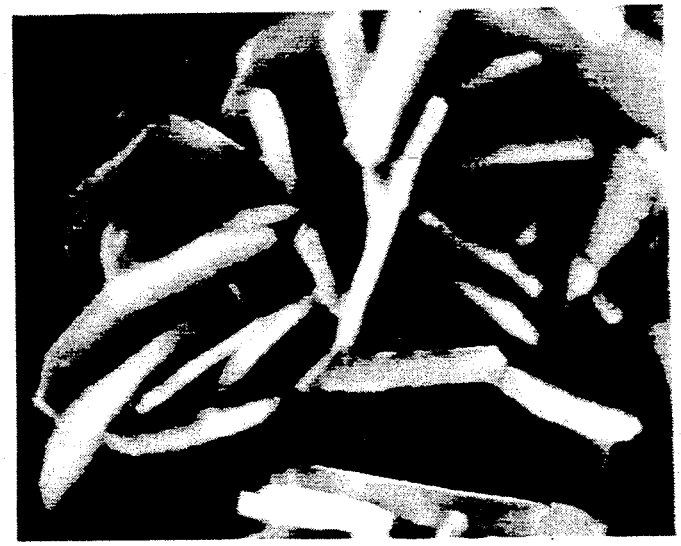

The obtained black particles were shown by transmission electron microscopy to have an average particle diameter of 2.0 μm. As is seen from the scanning electron micrograph in FIG. 5 (×15,000), the plate-like particles had an aspect ratio (ratio of plate surface diameter to thickness) of 25:1, and there were no pores on the surface of or inside the particles.

Further, the obtained particles were individually distributed (non-sintered), its BET specific surface area was 4.8 m$^2$/g, its squareness ratio ($\sigma_r/\sigma_s$) was 0.082, and the obtained particles had an excellent orientation. The coercive force (Hc) of the particles was 53 Oe.

The X-ray diffraction pattern of the particles showed only peaks corresponding to magnetite, and it may thus be concluded that the particles consisted of magnetite.

COMPARATIVE EXAMPLE 1

A black precipitate was formed as in Example 1 excepting that FeCl$_2$ was used instead of FeSO$_4$. After cooling to room temperature, the obtained black precipitate was filtered off, washed with water, dried and disagregated by the usual methods.

Figure 6:
FIG. 6 is an electron micrograph showing the isotropic magnetite particles obtained in Comparative Example 1.

The obtained black particles were shown by transmission electron microscopy to have an average particle diameter of 0.25 μm. As is seen from the scanning electron micrograph in FIG. 6 (×30,000), the obtained particles exhibited an isotropic form.

REFERENCE EXAMPLE 1

0.83 l of an aqueous solution of ferrous sulfate of 1.35 mol/l was added to a reaction vessel kept under a flow of N$_2$ gas, in which had been placed 3.67 l of an aqueous solution of Na$_2$CO$_3$ of 0.62 mol/l to which had been added 1.65 g of trisodium citrate dihydrate, such that the resulting solution contained 0.5 mol % based on Fe (corresponding to CO$_3$/Fe=2.0 equivalents), and FeCO$_3$ was formed at a temperature of 60° C. The iron concentration was then 0.25 mol/l (calculated as Fe). The resultant aqueous solution containing FeCO$_3$ was subjected to aging treatment at 85° C. for 30 min. while blowing in N$_2$ gas at a rate of 15 l/min, and particles were then formed by blowing in air at 85° C. for 2.0 hours at a rate of 18 l/min.

When the oxidation reaction was completed, part of the reaction solution was removed, and was made acid with hydrochloric acid. The presence or absence of Fe$^{2+}$ was determined by the presence or absence of a blue coloration on adding a solution of red prussiate of potash.

The particles obtained were filtered off, washed with water, dried and disagregated by the usual methods. This obtained particles were shown by transmission electron microscopy to have an average particle diameter of 0.39 μm. From a scanning electron micrograph, the plate-like particles had an aspect ratio (ratio of plate surface diameter to thickness) of 8:1, and there were no pores on the surface of or inside the particles.

Further, the obtained particles had a BET specific surface area of 8.5 m$^2$/g. Concerning magnetic properties, coercive force Hc was 110 Oe, saturation magnetization $\sigma_s$ was 87.8 emu/g, and squareness ratio ($\sigma_r/\sigma_s$) was 0.168.

The X-ray diffraction pattern of the obtained particles showed only peaks corresponding to magnetite, and it may thus be concluded that the particle consisted of magnetite.

MANUFACTURE OF PLATE-LIKE MAGHEMITE PARTICLES

EXAMPLES 5-8

EXAMPLE 5

70 g of the plate-like magnetite particle obtained in Example 1 was heated in air at 250° C. for 30 min so as to obtain maghemite particles.

Figure 7:
FIG. 7 is an electron micrograph showing the plate-like maghemite particles obtained in Example 5.

The maghemite particles obtained were shown by transmission electron microscopy to have an average particle diameter of 1.0 μm. As is seen from the scanning electron micrograph in FIG. 7 (×12,000), the plate-like particles had an aspect ratio (ratio of plate surface diameter to thickness) of 7:1, and there were no pores on the surface of or inside the particles.

Further, the BET specific surface area of these plate-like maghemite particles was 2.7 m²/g. Concerning magnetic properties, coercive force Hc was 60 Oe, saturation magnetization $\sigma_s$ was 80.0 emu/g, and squareness ratio ($\sigma_r/\sigma_s$) was 0.105.

EXAMPLES 6-8

Plate-like maghemite particles were prepared by the same method as in Example 5 excepting that various kinds of plate-like magnetite particles were used.

Table 1 shows the principal manufacturing conditions used and the properties of the particles obtained.

The X-ray diffraction patterns of the particles obtained in Examples 6-8 all showed only peaks corresponding to maghemite. Further, the scanning electron micrographs showed that all the particles consisted of plate-like particles, and that there were no pores on the surface of or inside the particles.

face area of not more than 6.0 m²/g, and a coercive force of not more than 80 Oe.

5. Poreless, non-sintered plate-like maghemite particles according to claim 4, which have an aspect ratio (ratio of plate surface diameter to thickness) of 3-35:1.

6. Poreless, non-sintered plate-like maghemite particles according to claim 4, which have a squareness ratio (ratio of $\sigma_r$ to $\sigma_s$) of 0.070-0.125:1.

7. A process for producing poreless, non-sintered plate-like magnetite particles having an average particle diameter of more than 0.5 μm and not more than 2.0 μm, a BET specific surface area of not more than 6.0 m²/g, and a coercive force of not more than 80 Oe, said process comprising autoclaving an alkaline suspension containing ferric oxide hydroxide particles and ferrous hydroxide in the presence of sulfate ion at a temperature of 200°-300° C., whereby the concentration of ferric oxide hydroxide particles is 0.05-1.0 mol/l, the molar ratio of ferric oxide hydroxide particles to ferrous hydroxide is 2:1-1.5, the concentration of sulfate ion is 0.025-1.0 mol/l, and the concentration of free OH ion in the alkaline suspension is 0.1-10 mol/l.

8. A process for producing poreless, non-sintered plate-like maghemite particles having an average particle diameter of more than 0.5 μm and not more than 2.0 μm, a BET specific surface area of not more than 6.0 m²/g, and a coercive force of not more than 80 Oe, said process comprising the steps of:

(a) autoclaving an alkaline suspension containing ferric oxide hydroxide particles and ferrous hydroxide in the presence of sulfate ion at a temperature of 200°-300° C. to form plate-like magnetite particles, whereby the concentration of ferric oxide hydroxide particles is 0.05-1.0 mol/l, the molar ratio of the ferric oxide hydroxide particles to ferrous hydroxide is 2:1-1.5, the concentration of sulfate ion is 0.025-1.0 mol/l, and the concentration of free OH ion in the alkaline suspension is 0.1-10 mol/l, and thereafter (b) oxidizing the thus obtained plate-like magnetite particles by heating them in air at a temperature of 200°-400° C.

TABLE 1

| | | | Plate-like maghemite particles | | | | | | |
| | | | Particle properties | | | | Magnetic properties | | |
| Example | Kind of plate-like magnetic particles (Example No.) | Oxidation temperature (°C.) | Average particle diameter (μm) | Aspect ratio | Presence or absence of pores | BET specific surface area (m²/g) | Coercive force (Hc) (Oe) | Saturation magnetization ($\sigma_s$) (emu/g) | Squareness ratio ($\sigma_r/\sigma_s$) |
| --- | --- | --- | --- | --- | --- | --- | --- | --- | --- |
| Example 5 | Example 1 | 250 | 1.0 | 7:1 | No pore | 2.7 | 60 | 80.0 | 0.105 |
| Example 6 | Example 2 | 250 | 1.5 | 21:1 | " | 5.3 | 75 | 81.9 | 0.121 |
| Example 7 | Example 3 | 250 | 0.7 | 6:1 | " | 3.4 | 70 | 80.5 | 0.105 |
| Example 8 | Example 4 | 250 | 2.0 | 25:1 | " | 4.6 | 67 | 79.8 | 0.115 |

What is claimed is:

1. Poreless, non-sintered plate-like magnetite particles having an average particle diameter of more than 0.5 μm and not more than 2.0 μm, a BET specific surface area of not more than 6.0 m²/g, and a coercive force of not more than 80 Oe.

2. Poreless, non-sintered plate-like magnetite particles according to claim 1, which have an aspect ratio, (ratio of plate surface diameter to thickness) of 3-35:1.

3. Poreless, non-sintered plate-like magnetite particles according to claim 1, which have a squareness ratio (a ratio of $\sigma_r$ to $\sigma_s$) of 0.070-0.125:1.

4. Poreless, non-sintered plate-like maghemite particles having an average particle diameter of more than 0.5 μm and not more than 2.0 μm, a BET specific surface area of not more than 6.0 m²/g, and a coercive force of not more than 80 Oe.

* * * * *